May 20, 1958 W. B. CONRAD 2,835,539
CONTINUOUS BEARING TRACK CONSTRUCTION
Filed Nov. 23, 1953
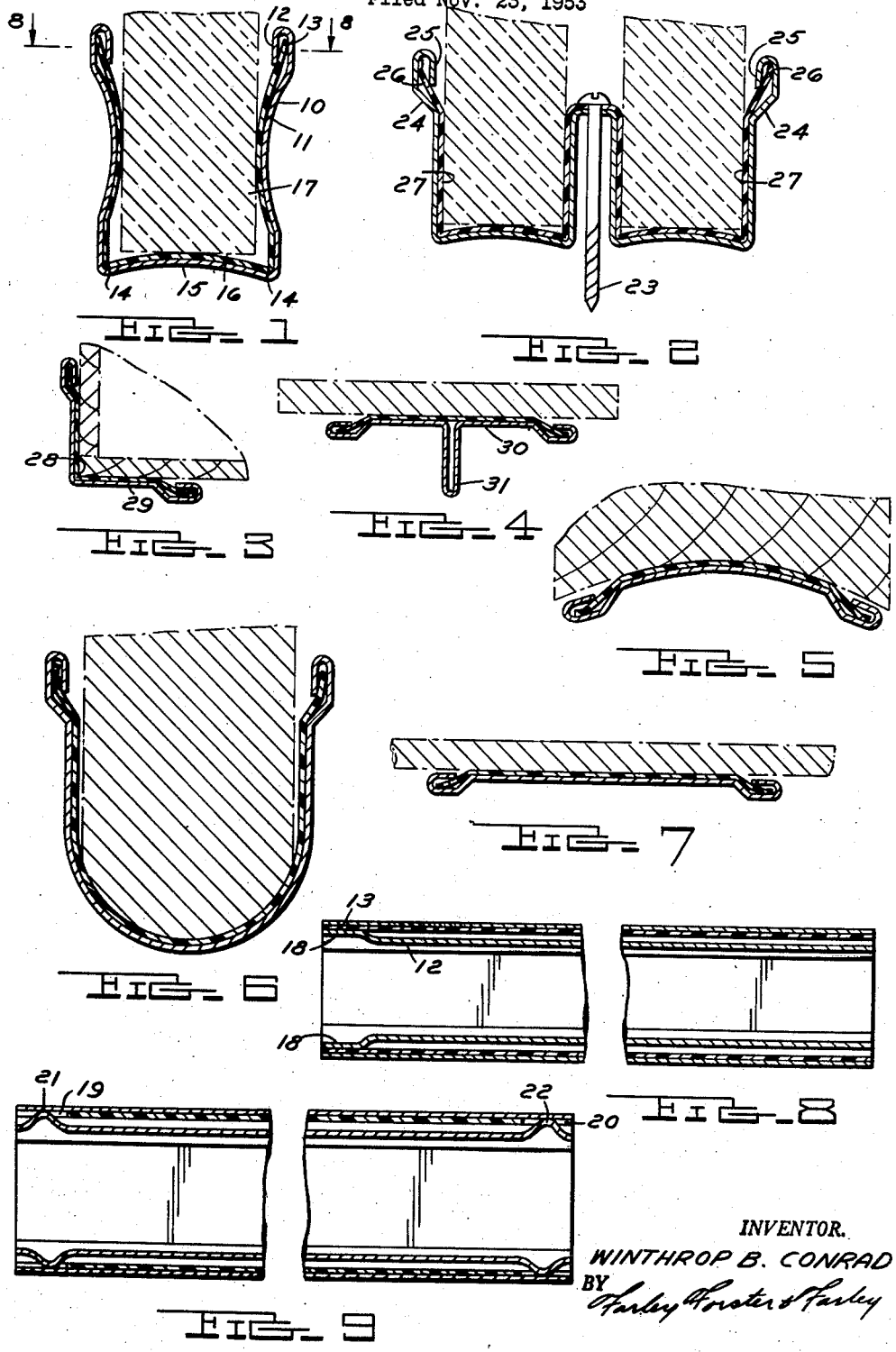
INVENTOR.
WINTHROP B. CONRAD
BY
ATTORNEYS

United States Patent Office 2,835,539
Patented May 20, 1958

2,835,539

CONTINUOUS BEARING TRACK CONSTRUCTION

Winthrop B. Conrad, Franklin, Mich., assignor, by mesne assignments, to Polymer Processes, Inc., Reading, Pa., a corporation of Pennsylvania Application November 23, 1953, Serial No. 393,801

15 Claims. (Cl. 308—3)

This invention relates to a continuous bearing track construction for sliding elements.

The desirable low friction, high wear resistant bearing properties, either with or without lubrication, of certain plastic materials have resulted in their use for many years in the manufacture of cylindrical bearings, particularly in applications where it is difficult or impossible to lubricate the bearing surfaces. Synthetic linear condensation polyamides, known to the trade as "nylon," such as disclosed in United States Letters Patent No. 2,246,086, and high molecular weight ethylene polymers such as disclosed in United States Letters Patent No. 2,246,092 are the best known examples of such plastic bearing materials. In the construction of such cylindrical plastic bearings adapted for use with metal housing or backing members, the characteristically high plastic coefficient of thermal expansion, which in the case of nylon is in the order of ten times that of steel, has not prevented widespread use. For example, heavy wall cylindrical bearings have been employed in split form with segments totaling less than 360° as illustrated in United States Letters Patent Nos. 2,246,086 and 2,246,092. Cylindrical nylon bearings have also been pressure molded integrally within cylindrical metal backing members or cages to provide a relatively thin inner sleeve of plastic bearing material, minimizing radial dimensional change, such sleeve being integrally united with radial extensions of the same material anchored to the cylindrical metal members as illustrated in United States Letters Patent Nos. 2,459,598 and 2,622,949. Other commercially satisfactory cylindrical bearings have also been produced by spirally coiling thin flat strips of nylon within a cylindrical metal housing utilizing a bias end cut and snap rings at either end to hold the nylon strip in longitudinal position while permitting it to expand in length and float within the metal housing.

While numerous means have thus been devised for utilizing plastic bearing materials such as nylon in cylindrical bearings, any low cost adaptation to continuous longitudinally extending bearing surfaces has heretofore been severely limited by numerous technical and economic obstacles. For example, while pressure molding procedures are practicable and economic for the production of desired nylon shapes in relatively short pieces, such as involved in cylindrical bearings, the application of such pressure molding techniques to the production of relatively long continuous bearing shapes is generally impracticable due to the excessively high mold costs which would be involved. On the other hand, extrusion procedures applicable to the production of long continuous nylon bearing shapes have proved exceedingly difficult to develop and entirely impracticable for compound cross-section shapes. Furthermore, even if extrusion or pressure molding techniques were feasible in other respects, the material costs alone in providing a continuous longitudinal nylon bearing shape of compound cross-section with sufficient body to provide necessary structural rigidity would in itself render either procedure prohibitive in cost for most applications.

While successful commercial extrusion procedures have been developed for simple nylon shapes such as flat thin strip material, in the order of .005 to ⅛ of an inch in thickness and up to 4 inches in width, the use of such strip materials in providing longitudinal bearing surfaces has likewise been severely limited due to inherent difficulties in adequately securing the strip to a longitudinally extending metal backing member. The use of conventional adhesives has proved generally unsatisfactory in providing a bond with such materials as nylon and even though an initial bond may be obtained by elaborate and expensive cementing procedures, the high difference of thermal coefficient of expansion of the nylon material relative to conventional metal backing members results in buckling of the nylon strip wherever substantial temperature variations are involved. Likewise, other conventional securing methods such as screwing, riveting, etc., are generally unsatisfactory for attaching nylon strip to longitudinally extending metal backing members, particularly where the required bearing surface involves a cross-sectional contour other than a flat plane surface, and where substantial temperature variations are involved.

Thus, long-existent needs for low cost continuous bearing tracks for numerous sliding members such as windows, doors, drawers, etc., requiring no lubrication and having desirable low friction, wear resistant properties, have heretofore gone unanswered notwithstanding the availability of plastic bearing materials such as nylon having such desired bearing properties and the widespread use of such materials in cylindrical bearings.

The principal object of the present invention is to provide a low cost continuous bearing track construction adaptable to virtually any desired uniform cross-sectional contour and utilizing the desirable bearing properties of nylon or similar plastic bearing materials.

Another object is to utilize available extruded forms of thin, flat nylon or similar plastic strip material in the construction fo a longitudinal bearing having any desired cross-sectional bearing surface contour.

Another object is to limit the plastic bearing material to substantially the immediate bearing surface without relying on such material to provide any structural rigidity to the bearing track assembly thereby minimizing the quantity of bearing material required.

Another object is to provide a composite bearing track construction incorporating a nylon or similar plastic bearing surface supported by a metal track of suitable contour adapted to locate and hold the plastic bearing material in its operating position while permitting relative thermal expansion and contraction between the bearing material and the track.

Another object is to provide a composite bearing track assembly wherein both the plastic bearing material and supporting metal track are formed from relatively thin flat strip stock.

Another object is to provide a composite bearing track construction wherein both the plastic bearing material and metal track member may be simultaneously roll formed in continuous lengths from such thin flat strip material.

Another object is to provide a composite bearing track construction wherein the marginal side edges of the plastic bearing material are transversely located and confined by overlapping edges of the metal track member without preventing longitudinal expansion and contraction of the plastic bearing material relative to the metal track member.

Another object is to provide a composite bearing track construction wherein such marginal edges of the metal track member are adapted to lie outside of the planes of adjacent bearing surfaces.

Another object is to provide means for longitudinally securing the plastic bearing material relative to such metal track member while permitting relative longitudinal expansion and contraction therebetween.

Another object is to adapt such composite bearing track construction to provide sealing contact with the sides of elements slidable therein.

Another object is to adapt such composite track construction to accommodate a plurality of adjacent slidable members.

Another object is to provide a number of specific forms for such composite bearing track construction adapted to particular typical requirements.

These and other objects will be more apparent from the following detailed description of a number of preferred embodiments of my invention and from an examination of the drawings illustrating such embodiments wherein:

Fig. 1 is a cross-sectional view of a single channel composite bearing track construction adapted to provide sealing contact with the sides of a glass element slidable therein.

Fig. 2 is a similar sectional view of a double channel construction adapted to accommodate adjacent slidable glass panes.

Fig. 3 is a similar sectional view of the composite bearing track construction adapted to accommodate the corner of a drawer.

Fig. 4 is a similar sectional view of a modification adapted to provide a flat bearing surface.

Fig. 5 is a sectional view of a modification adapted to provide a convex bearing surface.

Fig. 6 is a sectional view of a modification adapted to provide a concave bearing surface.

Fig. 7 is a sectional view of a further modification adapted to provide a flat bearing surface.

Fig. 8 is a sectional plan view of the channel bearing track construction taken along the line 8—8 of Fig. 1 showing one means for securing the plastic bearing material longitudinally within the metal track member.

Fig. 9 is a similar view showing a second means for securing the plastic bearing material longitudinally.

Referring to Fig. 1 it will be seen that a plastic bearing material, preferably a synthetic linear condensation polyamide such as nylon, is held within a metal channel track 11 having its marginal edges 12 formed to overlie and confine without positively gripping the marginal edges 13 of the plastic bearing material thereby holding the bearing material against transverse dislocation or separation from the track without limiting its longitudinal expansion and contraction within the track. The plastic bearing material is adapted to freely assume and retain the contour of the channel member without being bonded thereto by appropriate scoring, as at the corners 14, which causes the relatively flexible and resilient plastic material to bend as sharply as required. The main lower bearing surface 15 is preferably formed with a slight convex contour to minimize frictional resistance to the flat lower edge surface 16 of any sliding element such as the glass pane shown.

In order to provide a positive weather seal and inhibit rattling, as where the bearing track is employed for automobile windows, the metal channel member 11 may be formed with side contours as shown adapted to engage the window along lines substantially spaced from the base of the track and having a relaxed width somewhat less than the thickness of the window so as to cause engagement under suitable spring tension in the channel member 11.

As shown in Fig. 8, the plastic bearing material is secured longitudinally at one point only by crimping the edges of the channel track as at 18 against the interposed edges 13 of the plastic bearing material leaving the remaining length of plastic bearing material completely free to expand or contract within the metal channel track. Alternatively, as shown in Fig. 9, the plastic bearing material may be notched, as shown at 19 and 20, to provide sufficient clearance at points of crimping 21 and 22 to accommodate maximum expansion of the bearing material under the highest temperatures to be encountered.

In Fig. 2 a modification is shown adapted to accommodate adjacent sliding glass panels with provision for securing the bearing track to a frame member by screw 23, such screw being adapted in this case to longitudinally locate the plastic bearing material at one point. If more than one screw is employed for each channel track, the bearing material may be punched out at additional securing points to permit necessary relative expansion and contraction.

The upper sides of the channel track are preferably offset as shown at 24 to permit the track edges 25 to be formed around the bearing material edges 26 without extending into the plane of the side bearing surfaces 27.

The modification in Fig. 3 is adapted to provide a right angle corner bearing surface suitable for drawer slides or the like, the plastic bearing material being scored in this case at the single corner 28 to permit it to assume the right angle contour of the metal angle track member 29. Here again, as in all other modifications, the bearing material is secured longitudinally to the metal track member at only one point or otherwise permitted to freely expand and contract relative thereto.

In the modifications of Figs. 4 and 7, flat bearing surfaces are provided and as shown in Fig. 4, the metal track member 30 may be formed with a depending leg 31 to add structural stiffness. Figs. 5 and 6 illustrate modifications adapted to provide convex and concave bearing surfaces for sliding elements having concave and convex bearing edges. It will be seen that the modification of Fig. 5 may be employed as a bearing track for sliding door panels providing an adequate centering effect for maintaining the lower edge of the door on the track, while requiring little or no floor recessing for the bearing track assembly.

It will be noted that in each of the illustrated modifications the metal track member is formed of uniform gage strip material adapted to be roll formed from flat strip coils by conventional roll forming procedures. From the above description it will also be understood by those skilled in the art that the nylon or other similar plastic bearing material in the form of coiled flat strip stock may be introduced simultaneously with the metal strip stock in the roll forming operation simply by making adequate provision for scoring the plastic bearing strip as required to permit it to assume and retain any sharp contours imparted to the track member in the roll forming operations. By such procedures, together with conventional flying cut-off operations, the composite bearing track assembly may be continuously, rapidly and economically formed in any desired lengths.

For most applications which do not involve extreme loads or severe abrasive wear, a relatively thin strip of nylon in the order of .010 to .015 of an inch is entirely adequate and preferred, particuarly where small sharp track contours are involved, although for large track contours and severe conditions the heavier gauge strip may be advantageously employed.

Thus it is seen that a composite continuous bearing track construction has been provided which may be adapted to virtually any required cross-sectional contour; which secures the highly advantageous bearing properties of plastic materials such as nylon; which employs a minimum quantity of bearing material confined substantially to the immediate bearing surface; which utilizes such bearing material in commercially available extruded strip form; and which is adapted to highly economical, fully automatic production methods involving in large volume quantities a total cost only slightly greater than the basic flat strip steel and bearing material costs per se.

While a number of preferred embodiments have been illustrated and described above in detail, it will be understood that numerous modifications might be resorted to without departing from the scope of my invention as defined in the following claims.

I claim:

1. A continuous bearing track assembly comprising a uniformly thin, longitudinally extending synthetic linear condensation polyamide strip formed with a transverse contour having one surface conforming to a required bearing surface, and a uniformly thin metal track member formed to engage and support the opposite surface of said strip, said track member being formed to extend around and loosely over each marginal side edge of said strip to locate it transversely free to expand and contract longitudinally relative to said metal track member and a local connection between said strip and said track member to limit relative longitudinal movement between the entire strip and the entire track.

2. A continuous bearing track assembly comprising a metal track member, and a strip of polyamide bearing material, said metal track member being formed transversely with oversize recesses for holding the marginal side edges of said strip loosely against displacement in a transverse plane and a local connection between said strip and said track member to limit relative longitudinal movement between the entire strip and the entire track.

3. A continuous bearing track assembly comprising a metal track member, and a strip of polyamide bearing material, said metal track member being formed transversely with oversize recesses for receiving the marginal side edges of said strip to confine it loosely against displacement in a transverse plane, the exposed bearing material adjacent said side edges providing a bearing surface, the innermost recessed edge of said track member being formed to extend outside of the plane of the adjacent bearing surface and a local connection between said strip and said track member to limit relative longitudinal movement between the entire strip and the entire track.

4. A continuous bearing track assembly comprising a uniform gauge U-shaped metal channel track member and a uniform gauge U-shaped strip of polyamide bearing material fitting within said channel track member, the marginal side edges of said channel track member being formed to extend around and loosely over the marginal side edges of said bearing material to confine it against displacement in a transverse plane and a local connection between said strip and said track member to limit relative longitudinal movement between the entire strip and the entire track.

5. A continuous bearing track assembly comprising a uniform gauge metal track member formed with a double-U channel transverse section, and a single strip of polyamide bearing material similarly formed to extend into each of the track channels, the outer marginal side edges of said metal track member being formed transversely to extend around and loosely over the marginal side edges of said strip to confine it against displacement in a transverse plane and a local connection between said strip and said track member to limit relative longitudinal movement between the entire strip and the entire track.

6. A continuous bearing track assembly comprising a metal track member having a generally concave transverse cross-section including at least one relatively sharp corner and a strip of relatively flexible, resilient polyamide bearing material adapted to fit within the concave contour of said metal track member, said metal track member being formed transversely with recesses for receiving the marginal side edges of said strip to confine it loosely against displacement in a transverse plane, said strip being scored along a line adjacent said corner to permit it to assume a sharp bend conforming to the contour of said track member and a local connection between said strip and said track member to limit relative longitudinal movement between the entire strip and the entire track.

7. A continuous bearing track assembly comprising a uniform gauge metal track member formed with a plurality of transverse U-shaped channel sections, and a single strip of polyamide bearing material similarly formed to extend into each of the track channels, the outer marginal side edges of said metal track member being formed to extend around and over the marginal side edges of said strip to loosely confine it against displacement in a transverse plane and a local connection between said strip and said track member to limit relative longitudinal movement between the entire strip and the entire track.

8. A continuous bearing track assembly comprising a uniform gauge metal track member formed with a convexly curved transverse section extending in an arc substantially less than 180°, and a strip of polyamide bearing material similarly formed to extend over said convex track section, the marginal side edges of said metal track member being formed to extend around and over the marginal side edges of said strip to loosely confine it against displacement in a transverse plane and a local connection between said strip and said track member to limit relative longitudinal movement between the entire strip and the entire track.

9. A continuous bearing track assembly comprising a uniform gauge metal track member formed with a substantially right angle transverse section, and a strip of polyamide bearing material similarly formed to extend within said right angle track section, the marginal edges of said metal track member being formed to extend around and over the marginal side edges of said strip to loosely confine it against displacement in a transverse plane and a local connection between said strip and said track member to limit relative longitudinal movement between the entire strip and the entire track.

10. A continuous bearing track assembly comprising a uniform gauge metal track member formed transversely with a bearing contour and a stiffening rib, and a strip of polyamide bearing material engaging said bearing contour and extending across said stiffening rib, the marginal side edges of said metal track member being formed to extend around and over the marginal side edges of said strip to loosely confine it against displacement in a transverse plane and a local connection between said strip and said track member to limit relative longitudinal movement between the entire strip and the entire track.

11. A continuous bearing track assembly comprising a uniform gauge metal track member formed transversely with a substantially flat bearing contour and a stiffening rib, and a strip of polyamide bearing material engaging said bearing contour and extending across said stiffening rib, the marginal side edges of said metal track member being formed to extend around and over the marginal side edges of said strip to loosely confine it against displacement in a transverse plane and a local connection between said strip and said track member to limit relative longitudinal movement between the entire strip and the entire track.

12. A continuous bearing track assembly comprising a metal track member, and a strip of polyamide bearing material having a substantially different coefficient of thermal expansion than said metal track member, said metal track member being formed transversely with oversize recesses for receiving the marginal side edges of said strip to confine it loosely against displacement in a transverse plane without limiting its free longitudinal expansion and contraction relative to said track member, and means locally attaching said strip to said track member at one longitudinal point only.

13. A continuous bearing track assembly comprising a metal track member, and a strip of polyamide bearing material having a substantially different coefficient of thermal expansion than said metal track member, said metal track member being formed transversely with oversize recesses for receiving the marginal side edges of said strip to confine it loosely against displacement in a transverse plane without limiting its free longitudinal expansion and contraction relative to said track member, and means for confining said strip against substantial longitudinal displacement relative to said track member.

14. A continuous bearing track assembly comprising a uniform gauge longitudinally extending polyamide bearing strip formed with a transverse contour having one surface conforming to a required bearing surface and a uniform gauge metal track member formed transversely to engage and support the opposite surface of said strip, said metal and polyamide having substantially different coefficients of thermal expansion, said track member being formed to extend around and over each marginal side edge of said strip to locate it transversely while permitting it to expand and contract longitudinally relative to said metal track member, the marginal side edges of said metal track member being locally crimped at one longitudinal point only to positively grip the side edges of said strip to locate it longitudinally without interfering with said relative longitudinal expansion and contraction.

15. A continuous bearing track assembly comprising a uniform gauge longitudinally extending polyamide bearing strip formed with a transverse contour having one surface conforming to a required bearing surface and a uniform gauge metal track member formed transversely to engage and support the opposite surface of said strip, said metal and polyamide having substantially different coefficients of thermal expansion, said track member being formed to extend around and over each marginal side edge of said strip to locate it transversely while permitting it to expand and contract longitudinally relative to said metal track member, the marginal side edges of said strip being locally notched at at least one longitudinal point, and the marginal side edges of said metal track member being locally crimped into the notched recess of said strip to locate it longitudinally without preventing said relative expansion and contraction.

References Cited in the file of this patent

UNITED STATES PATENTS

| | | |
|---|---|---|
| 1,907,117 | Keil | May 2, 1933 |
| 2,041,004 | Levan | May 19, 1936 |
| 2,068,563 | Murphy et al. | Jan. 19, 1937 |
| 2,072,899 | McKinney | Mar. 9, 1937 |
| 2,399,204 | Cameron | Apr. 30, 1946 |
| 2,504,510 | Ernest | Apr. 18, 1950 |
| 2,666,677 | Miller | Jan. 19, 1954 |
| 2,675,283 | Thomson | Apr. 13, 1954 |